United States Patent
Crayford et al.

(10) Patent No.: US 8,051,160 B2
(45) Date of Patent: Nov. 1, 2011

(54) METHOD AND APPARATUS FOR A NETWORK HUB TO DIAGNOSE NETWORK OPERATION AND BROADCAST INFORMATION TO A REMOTE HOST OR MONITORING DEVICE

(75) Inventors: Ian Crayford, Saratoga, CA (US); Thomas J. Runaldue, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/289,194

(22) Filed: Oct. 22, 2008

(65) Prior Publication Data

US 2009/0063670 A1 Mar. 5, 2009

Related U.S. Application Data

(63) Continuation of application No. 09/580,665, filed on May 26, 2000, now Pat. No. 7,457,857.

(60) Provisional application No. 60/136,083, filed on May 26, 1999.

(51) Int. Cl.
*G06F 15/16* (2006.01)

(52) U.S. Cl. ......... 709/223; 709/203; 709/224; 709/232

(58) Field of Classification Search .......... 709/202–203, 709/217–219, 223–224, 231–232; 370/345–348
See application file for complete search history.

(56) References Cited

U.S. PATENT DOCUMENTS

| | | | |
|---|---|---|---|
| 4,549,808 A | 10/1985 | Ernst | |
| 5,422,887 A * | 6/1995 | Diepstraten et al. | 370/347 |
| 5,541,927 A | 7/1996 | Kristol et al. | |
| 5,651,006 A | 7/1997 | Fujino et al. | |
| 5,708,834 A | 1/1998 | Sasaki et al. | |
| 5,774,670 A | 6/1998 | Montulli | |
| 5,809,253 A | 9/1998 | Gallagher et al. | |
| 5,819,173 A * | 10/1998 | Lawrence et al. | 455/515 |

(Continued)

FOREIGN PATENT DOCUMENTS

EP 0 878 768 11/1998

(Continued)

OTHER PUBLICATIONS

"Architecture for Stackable Hub Management," IBM Technical Disclosure Bulletin, Feb. 1996, pp. 3-9, vol. 39, No. 2, Armonk, New York (XP 000559801).

(Continued)

*Primary Examiner* — Bharat Barot

(57) ABSTRACT

A network hub in a communication network that acts as a server to network clients to push, or transmit, information regarding the state of local and remote devices and networks. The information can be one, or more, status information, which information can be one or more predefined fields in a frame, which represents a packet of data. In one embodiment, it is desirable that the frame be a "legitimate" Ethernet-type frame. The status field can be a "push"-Type status field. The push operation can be a unicast, a multicast, or a broadcast, or a hybrid transmission. The hub can be a switch, repeater, a bridge, a router, a gateway, or a hybrid thereof. Also, the hub according to the present invention can be an OSI Layer 2 device, an OSI Layer 3 device, or a hybrid thereof. It is desirable that the hub be devoid of a microprocessor. As described herein, the hub may have plural ports, for example, four, eight, or more ports.

18 Claims, 7 Drawing Sheets

U.S. PATENT DOCUMENTS

| | | | |
|---|---|---|---|
| 5,841,990 A | 11/1998 | Picazo, Jr. et al. | |
| 5,923,650 A * | 7/1999 | Chen et al. | 370/331 |
| 5,925,097 A * | 7/1999 | Gopinath et al. | 709/200 |
| 6,112,235 A | 8/2000 | Spofford | |
| 6,151,632 A * | 11/2000 | Chaddha et al. | 709/231 |
| 6,172,980 B1 * | 1/2001 | Flanders et al. | 370/401 |
| 6,259,701 B1 | 7/2001 | Shur et al. | |
| 6,311,206 B1 | 10/2001 | Malkin et al. | |
| 6,490,584 B2 | 12/2002 | Barrett et al. | |
| 6,631,409 B1 | 10/2003 | Watson et al. | |
| 6,647,414 B1 | 11/2003 | Eriksson et al. | |
| 6,742,127 B2 | 5/2004 | Fox et al. | |
| 7,251,231 B2 * | 7/2007 | Gubbi | 370/347 |
| 7,301,944 B1 | 11/2007 | Redmond | |
| 7,457,857 B1 * | 11/2008 | Crayford et al. | 709/223 |

FOREIGN PATENT DOCUMENTS

| | | |
|---|---|---|
| EP | 0878768 A2 | 11/1998 |

OTHER PUBLICATIONS

Dianlong Zhang et al., "Developing Network Management Applications in an Application-Oriented Way Using Mobile Agent," Computer Networks and ISDN Systems, Sep. 1998, pp. 1551-1557, vol. 30, No. 16-18, North Publishing, Amsterdam (XP 004138686).

* cited by examiner

| 302 | 304 | 306 | 318 320 | 308 | 310 | 312 | 314a | 314b | 314c | 314d | 314e | 316 |
|---|---|---|---|---|---|---|---|---|---|---|---|---|
| Destination Address (from MIB Autocast DA register) | Source Address (from MIB Autocast SA register) | Type (from MIB Autocast Type register) | ASCII Date String / OUI | OP-CODE | Port Number | Port State | MIB Statistic 1 | MIB Statistic 2 | MIB Statistic 3 | MIB Statistic n-1 | MIB Statistic n | FCS |

METHOD AND APPARATUS FOR A NETWORK HUB TO DIAGNOSE NETWORK OPERATION AND BROADCAST INFORMATION TO A REMOTE HOST OR MONITORING DEVICE

CROSS REFERENCE TO RELATED APPLICATIONS

This application claims priority of U.S. patent application Ser. No. 09/580,665, filed on May 26, 2000, which application claims priority of U.S. Provisional Application No. 60/136,083, filed May 26, 1999. The subject matter of these earlier applications is hereby incorporated by reference.

BACKGROUND OF THE INVENTION

Modern data communication networks are generally star-wired "hub and spoke" topologies, with a centralized hub, and multiple spokes which attach to each end-station, generally a computer or computer peripheral device. The centralized hub typically is responsible for conductivity between the individual devices and the network, and may provide a wide range of additional functionality. For instance, a simple Ethernet repeater is responsible for signal timing and amplitude restoration, basically receiving data from one port and repeating it to all other ports. Data received from two or more ports simultaneously constitutes a collision, causing the repeater to issue a "jam" sequence to all ports. The transmitting end-stations will detect the collision condition and back-off, and reschedule their transmission attempt after a predetermined interval. Repeaters usually operate at the physical layer (Layer 1) of the OSI 7-layer model.

A network switch has added functionality, which may allow multiple simultaneously conversations to exist between its ports. Generally, the switch stores a packet (or a portion of it) for some period of time, while it inspects the contents of the packet, and makes a determination as to which port(s) the packet should be forwarded. The switch forwards packets only to where they are destined. It does not forward frames to all ports, as in the case of a repeater, except in the case where it cannot resolve the frame contents to determine which port (s) should receive the frame. Switches may operate at Layer 2 (MAC layer), in which case they are called bridges, or Layer 3 (the network layer) in which case the switches can be referred to as routers. Bridges and routers initially were software-based, requiring a processor to make the forwarding decision. Network switches are generally hardware-based. Advances in VLSI technology have made it possible to integrate the functionality of a bridge (Layer 2 switch) or router (Layer 3 switch) into silicon.

A result of these integration capabilities has been the dramatic cost reduction of hub, or network infrastructure products. This has occurred to such an extent that star-wire topologies have been able to displace the older, traditional bus-based topologies, such as the original coaxial cable-based Ethernet and Cheapernet, with 10BASE-T and 100BASE-T repeater-based technologies. This initially occurred in the corporate environment, where the additional advantages of the star-wire topologies were of substantial value. For instance, fault isolation and diagnosis can be easier in a point-to-point environment where an individual station can be isolated from the rest of the network. Additionally, the centralized hub function can be a natural place to implement network management, since traffic can be monitored at each port, and statistics gathered to determine the performance of the network. However, simple networks, such as for small offices or even in homes, do not require sophisticated management, because it generally adds significant overall cost to the system and is not very useful because in these environments, a professional network manager is not present.

SUMMARY OF THE INVENTION

The invention herein provides a network hub in a communication network that acts as a server to network clients to push, or transmit, information regarding the state of local and remote devices and networks. The information can be one, or more, status information, which information can be one or more predefined fields in a frame, which represents a packet of data. In one embodiment, it is desirable that the frame be a "legitimate" Ethernet-type frame. The status field can be a "push"-Type status field. The push operation can be a unicast, a multicast, or a broadcast, or a hybrid transmission. The hub can be a switch, repeater, a bridge, a router, a gateway, or a hybrid thereof. Also, the hub according to the present invention can be an OSI Layer 2 device, an OSI Layer 3 device, or a hybrid thereof. It is desirable that the hub be devoid of a microprocessor. As described herein, the hub may have plural ports, for example, four, eight, or more ports.

The hub according to the present invention includes memory registers, for example, for storing information such as management information base (MIB) statistics. The hub also can have a MIB engine. It is preferred that the hub integrally include a transceiver (PHY) and switching fabric, and, additionally, an address resolution table.

In another embodiment, the communication apparatus of the present invention can include a network detector detecting information representative of the state of a local or remote device or network, a network information table storing the information, and a network information transmitter for push transmitting the information to a number of clients. Optionally, a network analyzer may be included into the hub. The network analyzer can produce information of the state of the network by analyzing information in the network information table, such as a MIB, and provide the information to the network information transmitter which, in turn, can push transmit the information to selected clients coupled to the communication network.

BRIEF DESCRIPTION OF THE DRAWINGS

FIG. 3 is a diagrammatic representation of a MIB Autocast packet of the present invention;

DETAILED DESCRIPTION OF THE INVENTION

Network management in a small office/home office (SOHO) environment has not been provided, primarily due to cost. Such management typically employs memory and components to monitor and collect the network statistics, as well as a separate processor to either display this data directly, or to pass it to a remote network management entity. Current high performance desktop computing and web-based programming tools such as HTML and Java™ make possible an intuitive, easy-to-operate, graphical user interface (GUI) which an unsophisticated user can operate using a series of display menus.

The current model for network management is "pull" technology, by which a client device requests a server device to send specified data. In a networked environment, data can be gathered by various devices in a network and stored in a predetermined network information memory, such as, for example, a Management Information Base (MIB). An MIB, as used herein, can be a table that contains relevant network statistics and data, and can be defined by IEEE standard 802.3, clause 30, although one skilled in the art would realize that other network management schemes may be used. Numerous standardized MIBs exist for particular classes of equipment, so that equipment from different vendors can interoperate. A centralized network manager polls these MIBs at some predefined interval to collect data. Data also is collected if an alarm state is generated by one of the network devices. Standard protocols are used to gather this information, the most common standard protocol being the Simple Network Management Protocol (SNMP). Data can be gathered, processed, stored, and/or displayed at this central location.

Embodiments of the invention herein employ "push" technology for network information management. In general, push technology is one by which a server, or data source, transmits information to a client, or data recipient, without a specific request for that information from the client. Push technology can employ unicasting, multicasting, broadcasting, or a hybrid thereof. Push technology network devices may be used in both a SOHO environment, as well as in a more sophisticated enterprise, or global, network environment.

Figure 1:
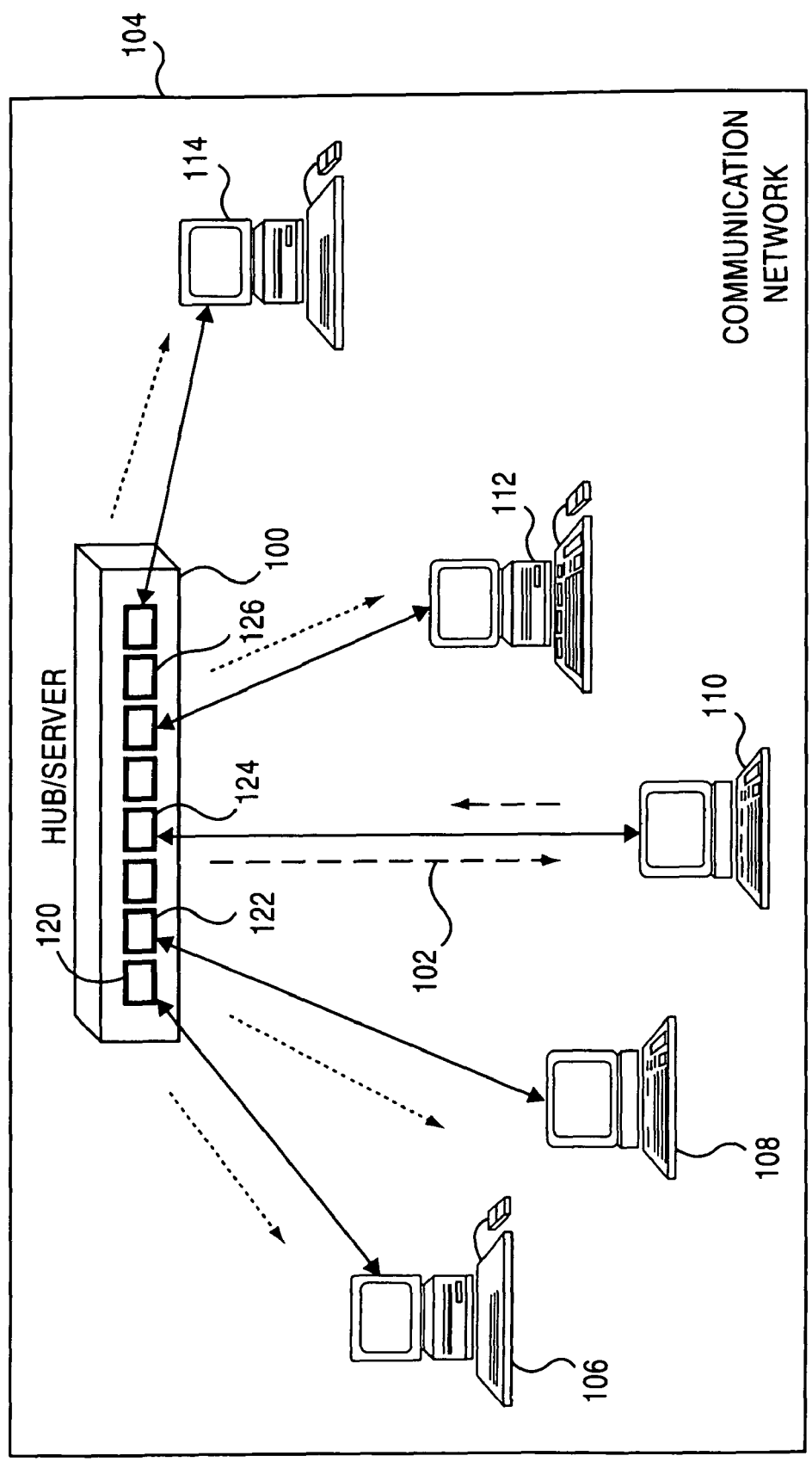
FIG. 1 is a diagrammatic representation of an embodiment of the present invention.

FIG. 1 illustrates an embodiment of the present invention. Network hub 100 transmits status information 102 regarding network 104 to attached network devices, or stations, 106, 108, 110, 112, 114, typically in a periodic manner. Hub 100 can be a a switch, a repeater, a bridge, a router, a gateway, or a hybrid thereof. These transmissions can be limited either by transmitting only on specific ports 120, 122, 124, 126 of hub 100, or by having only the appropriate receiving device(s) 106, 108, 110, 112, 114 programmed to accept packets sent to a specific network address, while all other stations drop these packets. The status information 102, preferably in the form of data frames, are sent sufficiently infrequently so as not to cause any significant traffic loading on network 104.

Because the information is transmitted, it is not necessary for a processor to be present in the hub device, in order to parse and respond to SNMP GET/SET requests. This can reduce complexity in costs in network hub 100, and can move feature differentiation, from a network management perspective, into the specialty software domain.

By supporting a very simple set of commands, this transmit reporting function can be turned on or off, such that an external management entity, e.g., station 110, can gain access to the information only when needed. Use of simple commands to hub 100, as passed over network 104, can increase the granularity of the data presented, so that more detailed information can be obtained by the external agent which then may be presented to experienced personnel for in-depth analysis of the information. Alternatively, graphical user interface 130 can be used to assist this process.

In a typical small network installation, similar to network 104, only one network device, for example device 110, will capture/process the transmitted status information frames 102. A network application loaded onto device 110 (typically a PC) can 30 process the data and present graphical user interface (GUI) 103 that is appropriate for the end user application. For instance, an application may provide two different classes of menus or screen options. The first may be for the unsophisticated user, where the management software actually performs substantial processing and/or analyzing of the received status information, such as in an expert system. It then can make simple recommendations to the user, in order to diagnose the status of the network, or of a potential problem. A second set of screens simply may present the collected statistical data in a raw, tabular format, for analysis by a trained network troubleshooter. Access to these menus may be restricted to authorized technical personnel.

Figure 2:
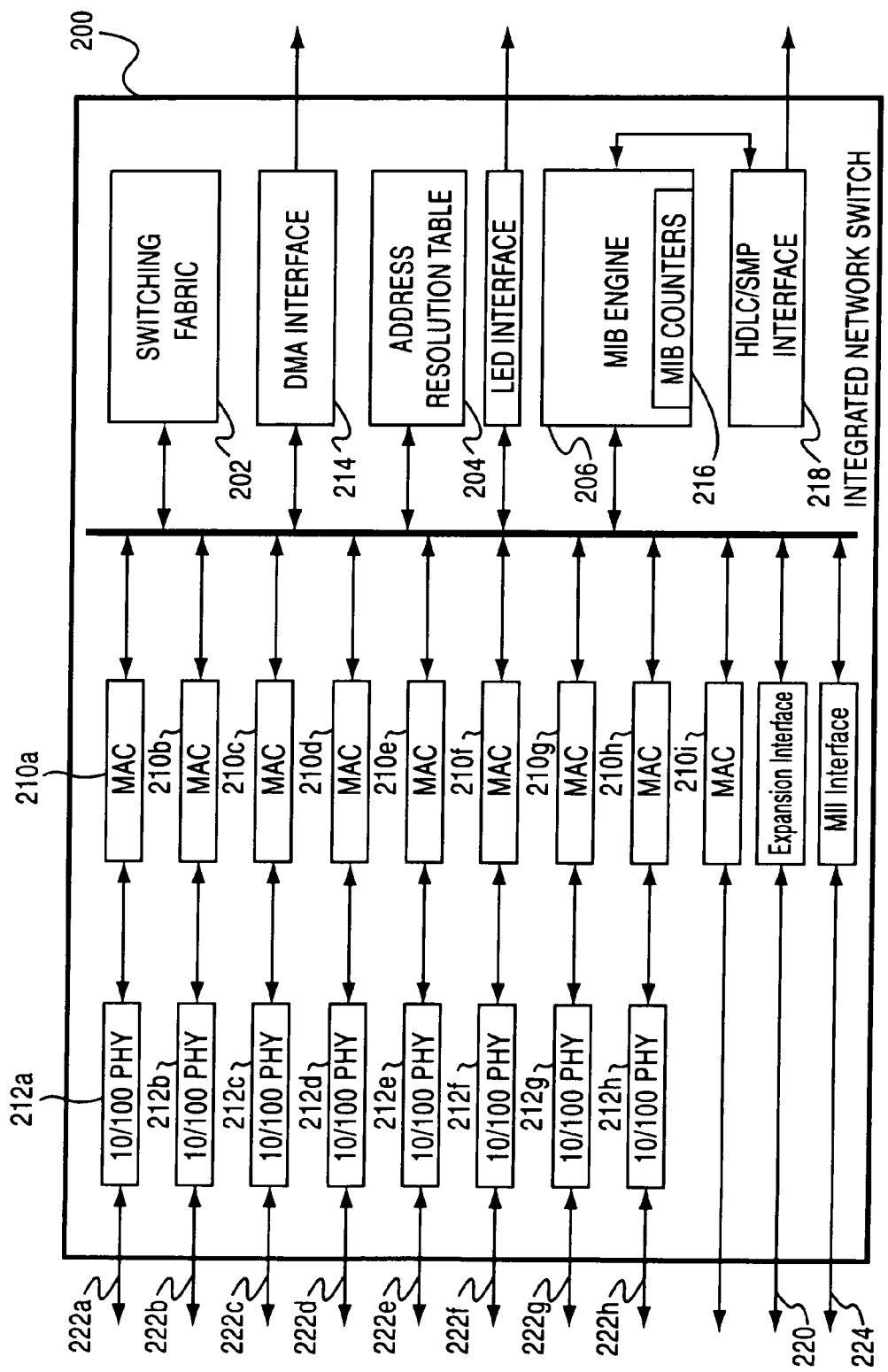
FIG. 2 is a block diagram illustrating a communication apparatus according to the invention herein.

FIG. 2 shows a simple block diagram of a switch device 200 which is an embodiment of the present invention. Using a "MIB-Autocast" feature, integrated network switching circuit 200 periodically transmits data field 202 of a preselected format, for example, a properly-formatted Ethernet frame, on a designated switch port or ports. The data fields, or frames, can be intercepted, for example, by an external management probe, or a dedicated network management application, resident on a node within the network.

Exemplary device 200 is a fully-integrated managed Layer 2 (L2) switch circuit, which can incorporate all of the key functions to enable a system product based on the device to be targeted at the enterprise switch market, or alternatively, at the SOHO connectivity market. One such exemplary device 200 includes, without limitation, the BCM5308M 9-Port Managed 10/100BASE-T/TX Switch, from Broadcom Corporation, Irvine, Calif.

Device 200 may integrate all of the major switching functions onto a single die, including switching fabric 202, address resolution logic 204, MIB engine 206, HDLC/SMP Interface 208, multiple Ethernet MACs 210a-210i, multiple 10/100 Mb/s Ethernet PHYs 212a-212h, SSRAM interface 214 for external packet storage, as well as hardware counters 216 to support multiple industry-standard MIBs. Although device 200 is shown with nine MACs 210a-210i, and eight PHYs 212a-212h, it will be appreciated that a greater (e.g., sixteen), or fewer (e.g., four), number of MACs and PHYs may be used to implement the present invention.

In this example, switch device 200 maintains multiple per-port counters 216, e.g., forty counters per port, for the key MIB attributes that can increment based on packet activity. These counters can be a combination of transmit, receive, and shared counters. The MIB Autocast feature allows the statistics to be packed into a normal Ethernet frame that switch device 200 constructs at regular time intervals. Other aspects of the MIB data that are generally static in nature, are assumed to be maintained in other ways, such as by a processor, by non-volatile memory, etc.

It is desirable that, using MIB Autocast, management information be conveyed with minimal impact on the system cost of the switch device. MIB Autocast frames can be captured and processed, stored, or analyzed as a background activity in any of the existing network nodes. It is most desirable that MIB Autocast technique be configurable to forward information to any port or port group. This can include the ability to cast frames only at the local CPU, attached via the management port of choice. This technique can be used to off-load routine processor reads on MIB registers 216. MIB statistics registers 216 can collect, receive, and transmit statistics for each port, and provide direct hardware support for the EtherLike MIB, Bridge MIB, MIB 2 (interfaces) and selected groups of the RMON MIB.

A stand-alone implementation of the aforementioned switch device 200, which has eight 10/100 Mb/s ports 212a-212h, 214 and one MII port 224, can have nine frames queued to each of its nine output ports. The feature of casting to output ports also is programmable, and is based on a port mask register within device 200. This allows each output port to be programmed individually as to whether it will have MIB Autocast frame 300 queued to it.

As an example, switch device 200 actually may have eleven physical ports, because, in addition to ports 212a-212h and 224, there is expansion port 220 and serial management port (SMP) 218. In this example, expansion port 220 may be used to interconnect multiple switch devices 200 to create a higher port density switch. Similarly, serial management port 218 may be used to configure and manage the device. In an embodiment of the present invention, the default port mask for MIB Autocast frames can be 03FFh. This will enable MIB Autocast frames to be transmitted over the nine network ports 212a-212h, 224, and expansion port 220 but disables transmission over SMP 218. The port mask may be stored in a programmable register, so it may be modified by connecting to SMP 218, an external microcontroller, as shown by microcontroller 416 in FIG. 4, or a state machine.

FIG. 3 illustrates a general format of MIB Autocast frame as implemented by a switch device. Each MIB Autocast frame 300 has multiple fields 302, 304, 306, 308, 310, 312, 314a-e, 316. Among the fields that can be included in frame 300 are Destination Address field 302, Source Address field 304, Type field 306, OPCODE field 308, Port Number field 310, Port State field 312, MIB Statistic fields 314a-314e, and FCS field 316. Each field can have extensions that permit extended information for expanded and scalable switch devices. While one embodiment allows a statistic report frame for each port to be individually constructed, it may be desirable to report switch performance, diagnostic, or configuration information, as well.

The hub (similar to hub 100 in FIG. 1, or switch device 200 in FIG. 2) can construct frame 300 of the general format shown in FIG. 3, preferably on a periodic basis. The period can be programmable to allow sufficient frequency of reporting, while not generating excessive network traffic. At each programmed time period, the hub gathers the statistics information for each of its ports, and constructs a frame containing this port-specific information. These statistics can be representative of, for example, an operational state of the network. Although ports that are disabled are unlikely to have changed status information, those statistics may nevertheless be gathered. A copy of the frame representative of a respective port then can be transmitted, or "cast," to each output port in the switch.

In one embodiment of the present invention, fields within the MIB Autocast frame can be programmable, such as the Destination Address 302, Source Address 304, Frame type 306, etc. Some fields can be hard coded, such as, for example, OPCODE field 308. In addition, the order and content of the frame with respect to the actual fields/MIB counters that are compacted together to make frame 300, can be hard coded. OPCODE field 308 allows simple two-way communication between a host management system, and the MIB Autocast function in the hub or switch device.

For example, the hub can recognize frames 300 directed to its specific MAC addresses and direct these to the management entity 110 as indicated in FIG. 1. In this case, referring back to FIG. 2, the single MAC address assigned to the switch 200 can be instantiated in the address resolution logic 204 as a static entry, with the egress port 208 identified as the Serial Management Port. The management system then can operate on this frame 300, determine if it is a "MIB Autocast configuration message" depending upon Type field 306 and OPCODE field 308, and take appropriate action. Such action can include increasing the granularity of reports, that is providing more frequent MIB Autocast frames 300, or more detailed data within frames 300; enable/disable the MIB Autocast function remotely; change the port mask; etc. These actions permit a closed-loop management system to be built where an external management entity monitors the MIB Autocast frames, and under specific conditions, it can recognize the frequency and/or content of the frames to enable a fault, or error condition, to be analyzed in more detail. The normal monitoring function can be resumed after the analysis has been completed. Once the exact configuration modes are defined, it may be desirable to hard code the modes to support a number of options.

Some exemplary assignments to OPCODE field 308 that can be used as extensions to the MIS Autocast protocol include, without limitation:
1. Program the default port mask from which MIB Autocast frames 300 are transmitted;
2. Change the destination address 302, source address 304 and/or Type fields 306 of the transmitted MIB Autocast frame;
3. Modify the time interval when MIB Autocast frames 300 are transmitted;
4. Disable/enable a physical switch port;
5. Restart autonegotiation on a specific switch port;
6. Enable/disable full duplex or pause capability on a specific switch port;
7. A supply and program additional header bytes to be inserted in MIB Autocast frame 300; and
8. Specify the internal registers, counters, or states that are to be included, or excluded, from MIB 300 Autocast frame.

The MIB Autocast function can be extensible in that it allows multiple devices in a network, and multiple chips in each device, to issue MIB Autocast frames. Operating multiple MIB Autocast devices in the network can be achieved because each MIB Autocast-capable device (e.g., device 200 in FIG. 2) can have its own unique 48-bit MAC address. Generally, it will be casting frame 300 to a well-known address, such as a default, learn, or assign unicast or multicast destination address. In a L2 switch network, the MIB Autocast frame 300 can converge on the network management entity as the intermediate switches learn the address in the network. The present invention is not limited to L2 switch networks, however, and can be implemented in more complex switch systems, for example, those using routing.

Thus, it may be desirable to insert specific character strings into the MIB Autocast frame when packets are forwarded across a routed (L3) environment. In an embodiment of the current invention, MIB Autocast frame may be configured to accept arbitrary length field 318, 320 located, for example, following Type field 306, and preceding OPCODE field 308. This may be performed by requesting an internal frame storage buffer from the switch device. One difference between this mechanism and the manner in which a data frame would use an internal frame storage buffer, is that the data frame tends to return the buffer once it had been re-transmitted to the appropriate port(s). For a frame buffer to the MIB Autocast process, the buffer is reserved, and is not returned to the internal free pool. When MIB Autocast frame 300 is constructed, and if the header insertion feature is enabled, the address of the buffer location that was returned by the switch device, and held in an internal switch device register, is read and a specific number of header bytes, which also are register programmable, can be inserted into the MIB Autocast frame.

Note that it is desirable that the host device writes the correct number of bytes of header information into the specified buffer location, and program the length of the header field. The device also should compute and provide any error check fields that are associated with the header information. It is desired that the switch device assemble the entire frame, including the inserted header, and compute and append the normal information prior to queuing for transmission. In one embodiment of the present invention, organizationally unique identifier (OUI) 320 in packet 300 identifies it as a management (push), or MIB Autocast, frame.

Also, MIB Autocast frame 300 could be identified using a special "push" Type field 318. Furthermore, the MIB Autocast DA field 302 can be an individual address, a multicast address, including reserve multicast, or a broadcast address. In an embodiment of the present invention, reporting can be turned on or off, and resolution can be set high or low, using simple commands that are intercepted and interpreted by the switch internally, or by an external microcontroller. MIB Autocast frame 300 can be enabled or reactivated after an error or threshold condition is detected, and are sufficiently small and infrequent so as not to adversely increase the traffic load on the network. It may be desirable to have a smart agent capture MIB Autocast frame 300, and process and store it, and/or display at a later time. Furthermore, the smart agent may issue configuration messages to modify the content or the frequency of MIB Autocast frames. Also, it may be desirable to have MIB Autocast-enabled hubs and switches to decrement a MIB Autocast frame field, such that it is known how many switch hops the MIB Autocast frame has traversed before reaching the current destination.

Figure 4:
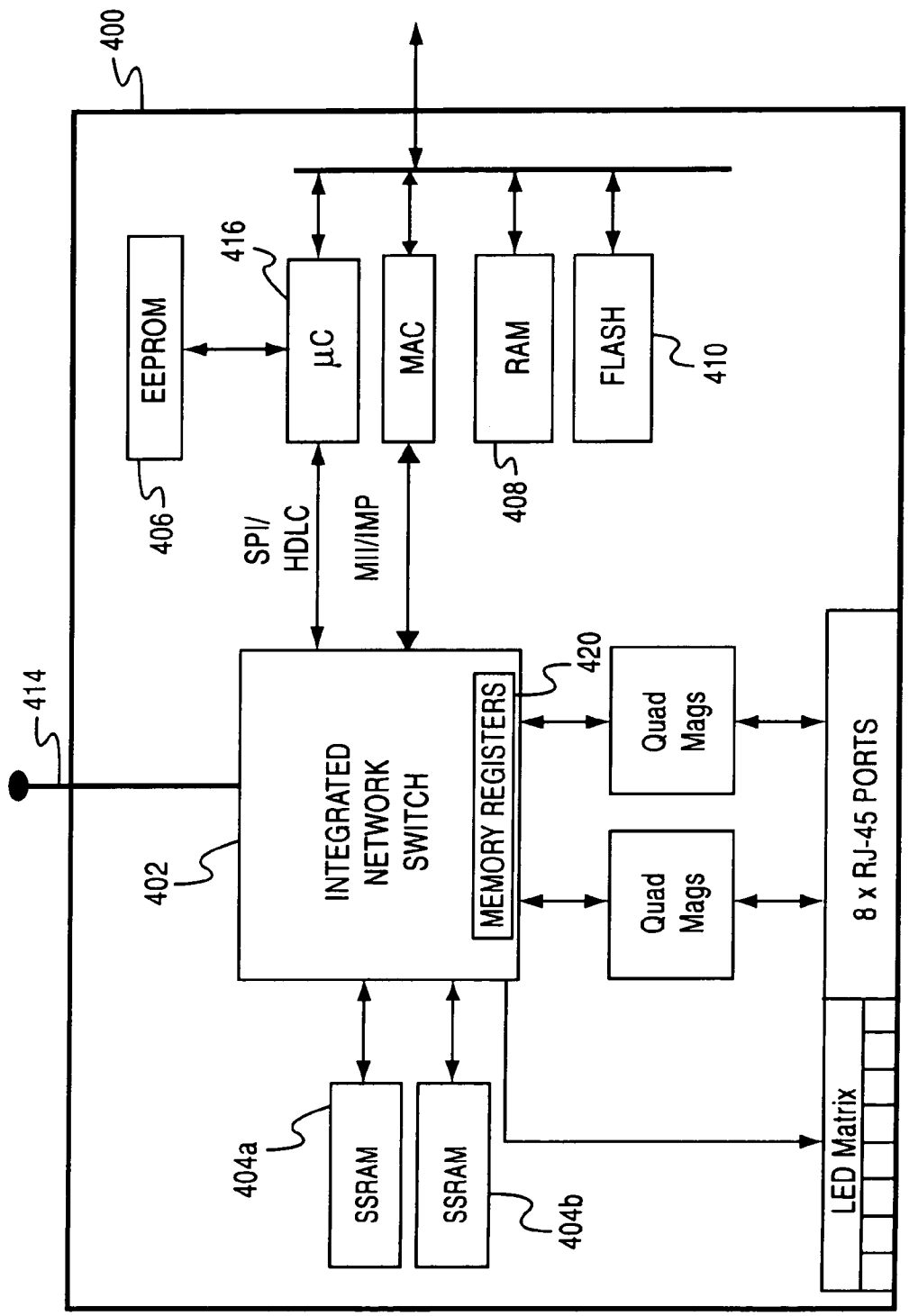
FIG. 4 is a block diagram of a network hub according to the present invention, containing an integrated network switch, similar to FIG. 2.

FIG. 4 illustrates a multiport hub 400, exemplary of another embodiment of the invention herein. Registers containing one or more information representative of one or more states of the network, including, for example, status and operational information, may be found in integrated network switch device 402, or in SSRAM 404a, 404b. In some instances, the information to be pushed may be stored in the memory of EEPROM 406, RAM 408, or FLASH memory 410. In any event, it is most desirable that switch device 402 act as a server to push the one or more information to the clients coupled thereto, as illustrated in FIG. 1.

While a variety of registers in exemplary hub 400 allow flexibility in configuring the MIB Autocast features, one of its key applications is providing very low cost and minimal overhead network management. For this reason, it is highly desirable to have the exemplary switch device operate without a general purpose microprocessor, and have a simple enable/disable of the MIB Autocast feature with simple default parameters.

One way to achieve this goal is to provide, on the switch device, an optional external pin strap 414 to allow MIB Autocast to either be enabled or disabled at power on. When this option is used, and assuming that no external processor is employed to change the default register configurations, the MIB Autocast frames can be generated at a default interval, and the state of all ports can be queued and transmitted on all active ports of the exemplary switch device, except for the SMP.

While it is desirable to have a processor-less solution, one implementation of the present invention can use a simple external microcontroller 416. For instance, microcontroller 416 can be used to implement sophisticated password or authentication techniques to activate vendor-specific system or device configuration features. Microcontroller 416 may be used to program a unique 48-bit MAC address, for example, in the IEEE 802.3 format, into a MIB Autocast Source Address Register, such that a frame transmitted by the device always will be identified as having originated from a unique switch. It is also possible for the present invention to be implemented in switch device 402 which integrates microcontroller 416 therein. Device 402 may also integrate serial EEPROM read circuit 406. Either the microcontroller 416, or EEPROM read circuit 406, can take the desired default MIB-Autocast parameters from external nonvolatile memory 410, and write them to the appropriate internal registers 420.

SSRAM buffer 404a, 404b, also can be used to incorporate a routing field into the frame or to save additional diagnostic, character string and/or configuration information. This information may be static or variable depending on the performance or the operational state of switch 402. Microcontroller 416 can update these fields routinely, which then also can be cast in the proposed manner. It also may be desirable to suppress casting MIB Autocast frames to a port that is disabled, that suffered a link fail, or that otherwise has been isolated. Furthermore, MIB Autocast-enabled device 400, 402 can use a specific frame to turn on a feature or to modify the configuration of the MIB Autocast frame (e.g. frame 300 in FIG. 3), using hardware or software security or encryption techniques.

Figure 5:
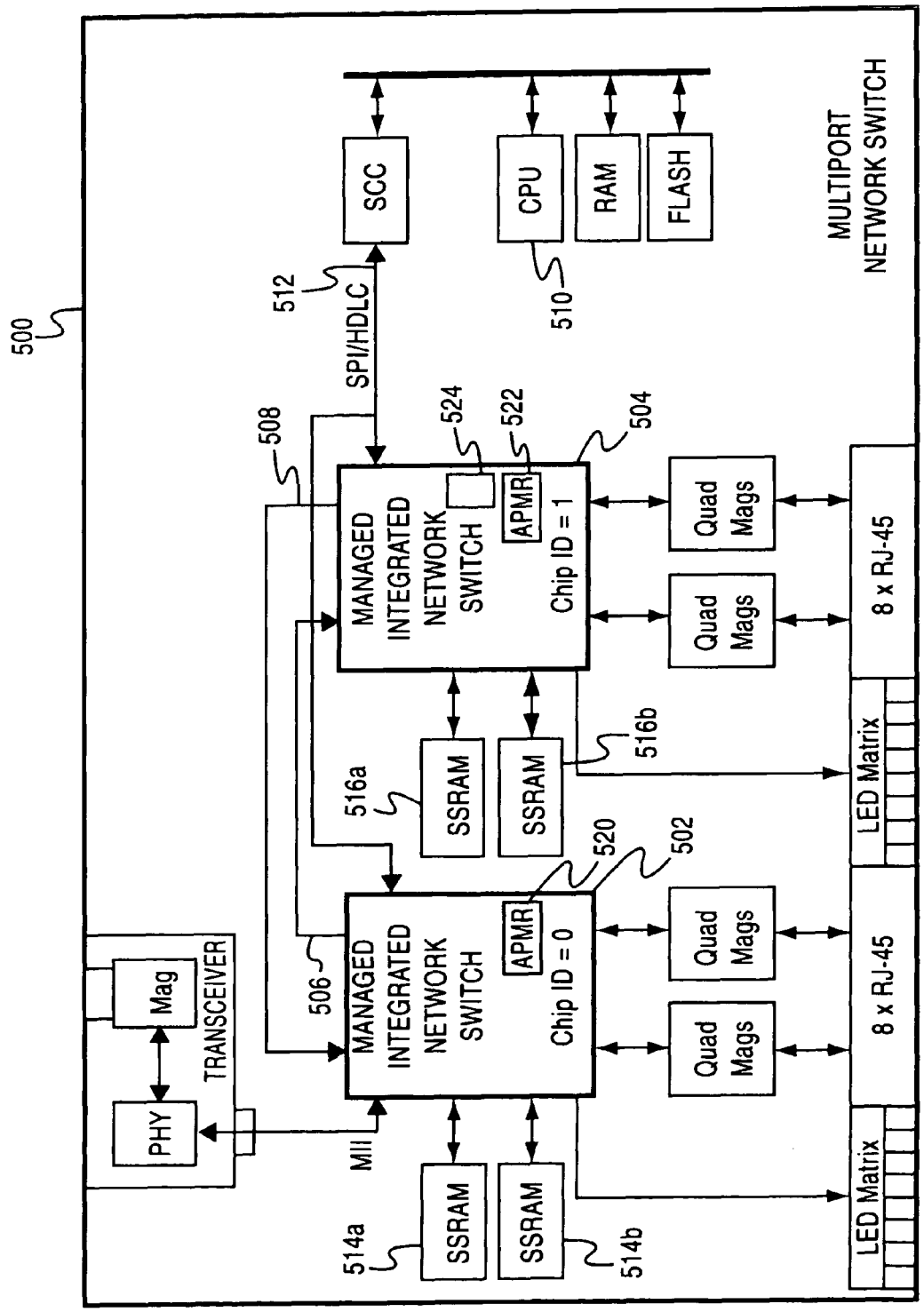
FIG. 5 is a block diagram of a high-port-density network hub according to the present invention, containing plural integrated network switches, similar to FIG. 2.

FIG. 5 illustrates a multiple switch hub 500, with each switch 502, 504 being similar to device 200 found in FIG. 2, and the associated data and configuration message flow for hub 500 being similar to device 200. Expansion ports 506, 508 on respective devices 502, 504 allow interconnection with other devices. A frame received on a port of one switch device with a DA unknown within the local address table, or a DA known to belong to a port on another switch device, will be forwarded across appropriate expansion port 506, 508. The look-up and learning mechanism by which MAC addresses are resolved in the address table is well-known to those skilled in the art. Configuration and status read/write operations to access internal switch device registers may be performed by CPU 510 using serial management port 512.

For MIB Autocast frames, which can be generated internally to switch devices 502, 504, additional registers, for example, in SSRAMs 514a, 514b, 516a, 516b, can be configured to allow the frames generated by one device, e.g., device 502, to be cast to any subset of the ports on another device, e.g., device 504, and to ensure that these frames do not circulate or replicate. Each device 502, 504 can insert its own chip ID in the port ID field of the MIB Autocast frame, similar to Port field 310 in FIG. 3, so the frame is uniquely distinct and can be attributed to an individual switch device.

Switch 502 (chip ID=0) generates an MIB Autocast frame for a port, and casts the frame to the ports enabled in its MIB Autocast ports mask register 522. In this case, the register is set to include the expansion port, as well as those network ports that are required to forward the frame. In this example, the frame is passed along the expansion port to switch 504 (chip ID=1). In switch 504, a special set of registers 524 can be configured which include the multiport address and multiport registers. These registers can be extensions of the address resolution table (ARL) and can be used in the address resolution process. Normal address entries in the switch device ARL always resolve to a single port egress decision.

The two pairs of multiport address/vector registers allow any 48-bit unicast or multicast address to resolve to a port vector, which means that frames can be queued to any programmable set of egress ports. In this example, the multiport address register can be programmed with the MIB Autocast destination address, i.e., the address of the stations in which the MIB Autocast management entity will reside. The multiport vector register would be programmed with the ports that are to cast the MIB Autocast packet which may include the expansion port. However, because the switch device typically masks the ingress port from the egress port vector before initiating the forwarding process, MIB Autocast frames received from the expansion port will not be forwarded back to it. It is desirable that the chip ID be preserved within the frame.

The switch device with switch 504 (chip ID=1) also would have its MIB Autocast port mask register programmed to forward its frames across the expansion port to switch 502 (chip ID=0). Switch 502 would have the similar multiport address/vector register set up such that it would forward MIB Autocast frames generated by switch 504 (chip ID=1) to the correct set of egress ports. These egress ports are not necessarily the same set of ports to which switch 502 (chip ID=0) MIB Autocast frames are forwarded.

Figure 6:
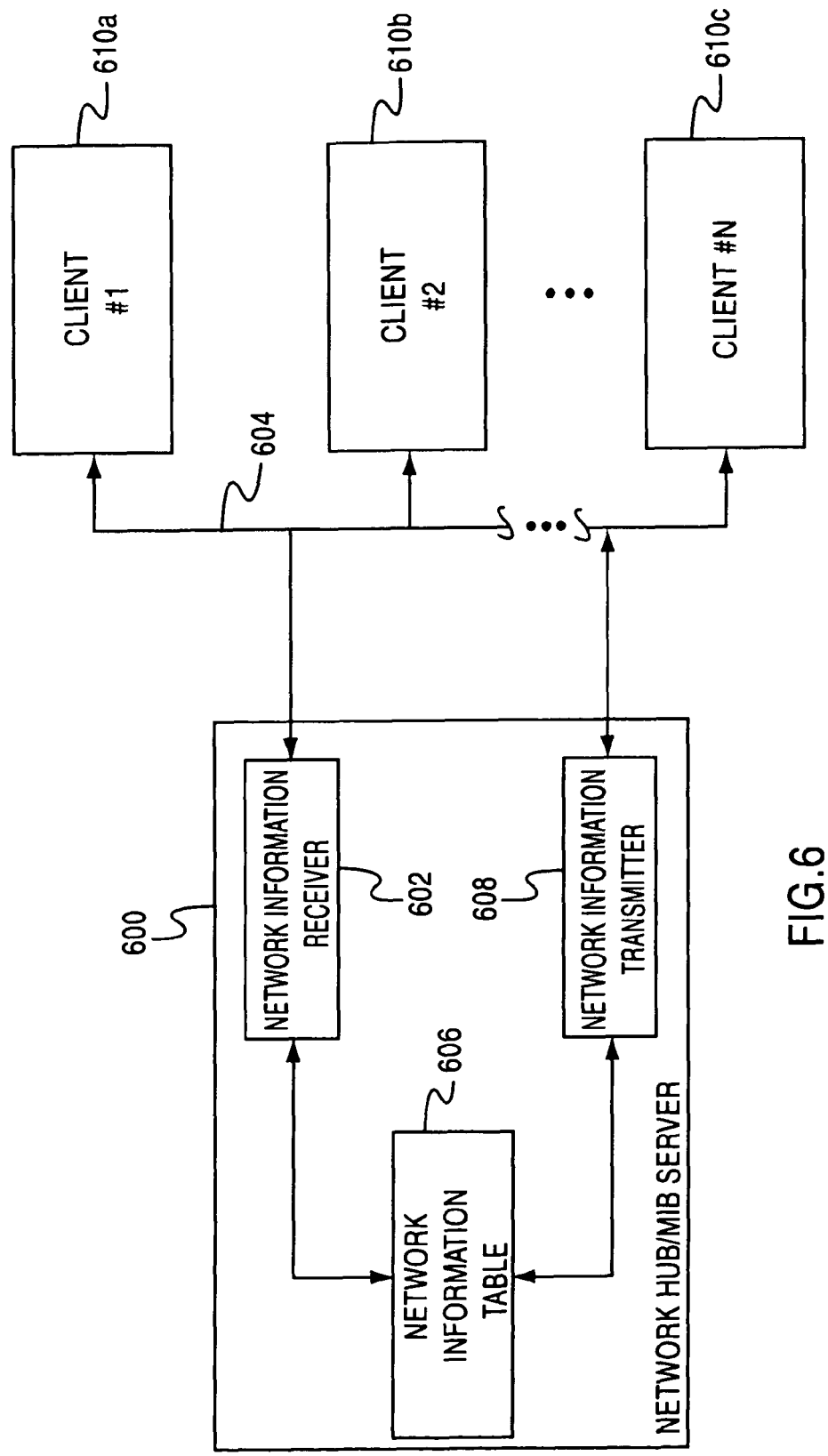
FIG. 6 is a block diagram of another embodiment of the invention herein.

Another embodiment of the present invention is a communication apparatus 600 as seen in FIG. 6. Apparatus 600 includes a network information receiver 602 which communicates with a communication network 604 and a network information table 606 used to store network information from the network information receiver 602. Apparatus 600 also includes a network information transmitter 608, which may be used to selectively transmit stored network information across communication network 604 to clients 610a-610c. The selective transmission is a "push" transmission and can be a unicast, a multicast, a broadcast, or a hybrid thereof.

Figure 7:
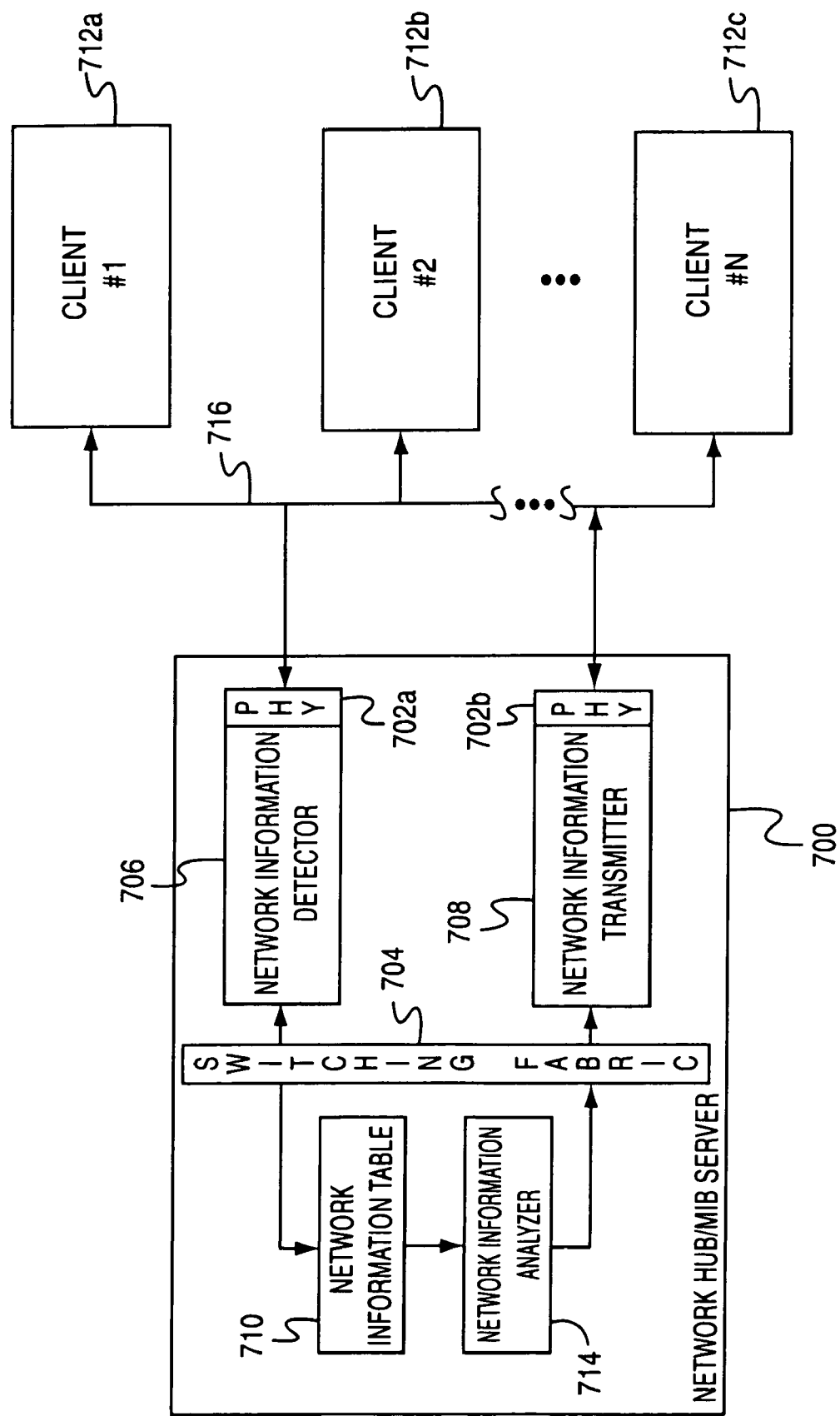
FIG. 7 is a block diagram of yet another embodiment of the present invention.

FIG. 7 illustrates apparatus 700 embodying the present invention in which transceiver (PHY) 702a, 702b and switching fabric 704 are integrally combined with network information detector 706. Apparatus 700 may be in the form of a network hub which can act as an MIB server which pushes information to clients 712a, 712b, 712c, in communication network 716. Hub 700 further may integrate network information transmitter 708, and network information table 710, or both. Although optional, it may be desirable to include network operation analyzer 714 to selectively analyze the information stored in network information table 710 and thereby produce an operational information, for example, of the operational state of the network.

In the latter instance, the network operations analyzer can analyze the network information and produce operational information of the operational state of that network. As used herein, the network hub may be a switch, a repeater, a bridge, a router, or a hybrid thereof. It is further desired that the network hub has multiple ports for example, four, eight, or more ports.

Although apparatus 700 can be used in an OSI Layer 2 network application, it also may be used in an OSI Layer 3 network application or a hybrid device spanning these two layers. It is desirable that the network information transmitter 708 selectively push MIB information, or other information which can be representative of operational information of the operational state of the network, to clients 712a, 712b, and 712c. It is desirable that the information be selectively pushed to clients 712a, 712b, 712c through unmasked ports of hub 700, and blocked from others of clients 712a, 712b, 712c by selectively masking ports of hub 700. The server can selectively push the operational information to one or more network clients using unicast, broadcast, or multicast techniques, or a hybrid thereof. It is desired that the network hub 700 be devoid of a microprocessor or microcontroller, although alternative embodiments of the push-transmission hub can employ a microprocessor, a microcontroller, or a EEPROM read-state machine.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

We claim:

1. A network device, comprising:
   one or more ports;
   one or more registers that are arranged and configured to collect and store port-specific information for each of the ports, wherein the port-specific information comprises information representative of an operational state of a network; and
   an engine that is arranged and configured to construct a data frame comprising one or more fields containing the port-specific information and to transmit the data frame by pushing the data frame on a periodic basis without receiving a request for the data frame from a source external to the network device, wherein the engine is arranged and configured to be configurable from a source that is external to the network device.

2. The network device of claim 1 wherein the port-specific information includes management information base information.

3. The network device of claim 1 wherein the network device is devoid of an internal processor.

4. The network device of claim 1 comprising one of an OSI Layer 2 network switch, an OSI Layer 3 network switch and a hybrid thereof.

5. The network device of claim 1 wherein the engine is configured to unicast the data frame.

6. The network device of claim 1 wherein the engine is configured to multicast the data frame.

7. The network device of claim 1 wherein the engine is configured to transmit the data frame to a plurality of clients.

8. An integrated circuit, comprising:
   one or more registers that are arranged and configured to collect and store network state information, wherein the network state information comprises information representative of an operational state of a network; and
   an engine that is arranged and configured to construct a data frame comprising one or more fields containing the network state information and to transmit the data frame by pushing the data frame on a periodic basis without receiving a request for the data frame from a source external to the integrated circuit, wherein the engine is arranged and configured to be configurable from a source that is external to the integrated circuit.

9. The integrated circuit of claim 8 wherein the network state information includes management information base information.

10. The integrated circuit of claim 8 further comprising a pin that is configured to enable and disable the transmission of the network state information.

11. The integrated circuit of claim 8 wherein the integrated circuit is devoid of an internal processor.

12. The integrated circuit of claim 8 wherein the engine is configured to unicast the data frame.

13. The integrated circuit of claim 8 wherein the engine is configured to multicast the data frame.

14. The integrated circuit of claim 8 wherein the engine is configured to transmit the data frame to a plurality of clients.

15. A network hub in a communication network, comprising:
a server, the server being configured to:
collect and store network state information, wherein the network state information comprises information representative of an operational state of a network; and
construct a data frame comprising one or more fields containing the network state information and transmit the data frame by pushing the data frame on a periodic basis without receiving a request for the data frame from a source external to the server, wherein the server is arranged and configured to be configurable from a source that is external to the server.

16. The network hub of claim 15 wherein the server is devoid of an internal microprocessor.

17. The network hub of claim 15 wherein the server is configured to unicast the data frame.

18. The network hub of claim 15 wherein the server is configured to multicast the data frame.

* * * * *